(12) United States Patent
Dunger et al.

(10) Patent No.: US 9,669,708 B2
(45) Date of Patent: Jun. 6, 2017

(54) RETRACTABLE VEHICLE FUELING RECEPTACLE COVER

(71) Applicants: Mark Steven Dunger, Frontenac, MO (US); James Fitzgerald Dunger, Frontenac, MO (US)

(72) Inventors: Mark Steven Dunger, Frontenac, MO (US); James Fitzgerald Dunger, Frontenac, MO (US)

( * ) Notice: Subject to any disclaimer, the term of this patent is extended or adjusted under 35 U.S.C. 154(b) by 173 days.

(21) Appl. No.: 14/608,192

(22) Filed: Jan. 29, 2015

(65) Prior Publication Data

US 2015/0231968 A1    Aug. 20, 2015

Related U.S. Application Data

(60) Provisional application No. 61/934,630, filed on Jan. 31, 2014.

(51) Int. Cl.
  *B62D 25/00* (2006.01)
  *B60K 15/05* (2006.01)

(52) U.S. Cl.
  CPC ...... *B60K 15/05* (2013.01); *B60K 2015/0523* (2013.01); *B60K 2015/0538* (2013.01)

(58) Field of Classification Search
  CPC .... B01J 3/03; B60K 15/05; B60K 2015/0515; B60K 2015/0523; B60K 2015/0538
  USPC ............. 220/86.2, 211, DIG. 33; 296/97.22; 292/142, 144, 160; 318/466; 141/312
  See application file for complete search history.

(56) References Cited

U.S. PATENT DOCUMENTS

| | | | | |
|---|---|---|---|---|
| 8,089,228 B2 * | 1/2012 | Ballard | ................. | B60K 15/05 |
| | | | | 141/312 |
| 8,439,421 B2 * | 5/2013 | Mihai | .................... | B60K 15/05 |
| | | | | 220/86.2 |
| 8,677,690 B2 * | 3/2014 | Lee | ........................ | B60K 15/05 |
| | | | | 296/97.22 |
| 2009/0126827 A1 * | 5/2009 | Guendouz | .......... | B60K 15/0406 |
| | | | | 141/312 |

\* cited by examiner

*Primary Examiner* — William Gilbert

(57) ABSTRACT

A system for automatically retracting a vehicle fueling receptacle lid, storing the lid within the body of the vehicle, and automatically returning the lid to its original protective position, such that the vehicle fueling receptacle lid will retract automatically upon instruction from the vehicle's onboard electronic control system and, further, will return to its original position, wherein it serves to protect the fueling inlet (whether such inlet allows for the storage of liquid fuel or for electrical charging), upon completion of a fueling or charging session, as instructed by the vehicle's onboard electronic control system.

2 Claims, 7 Drawing Sheets

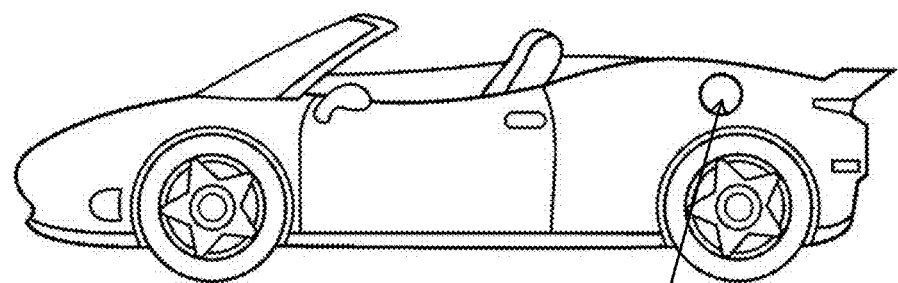
FIG. 1.A
(A)
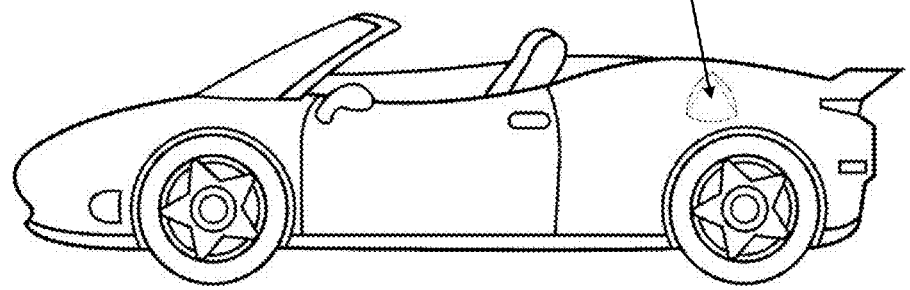
FIG. 1.B

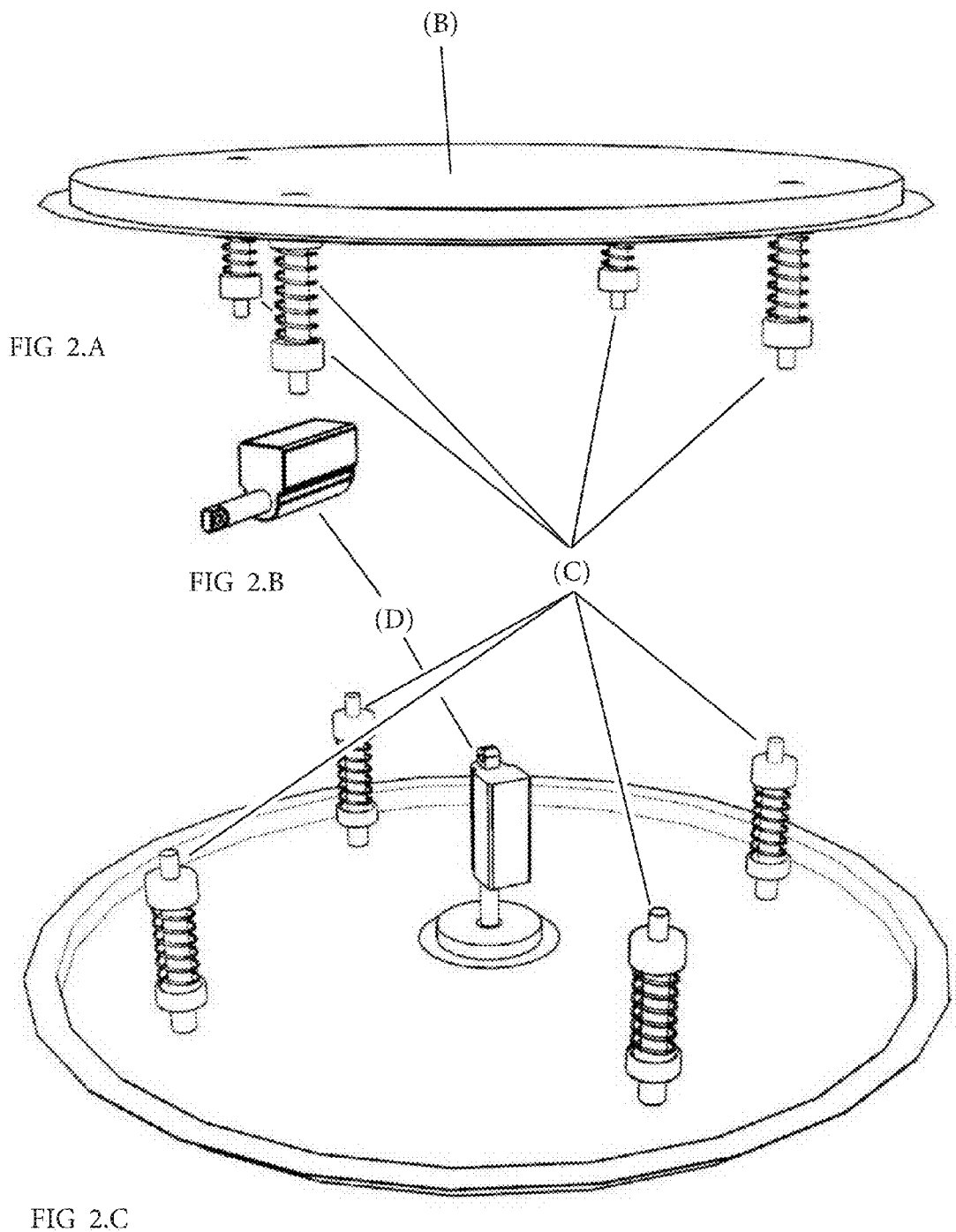

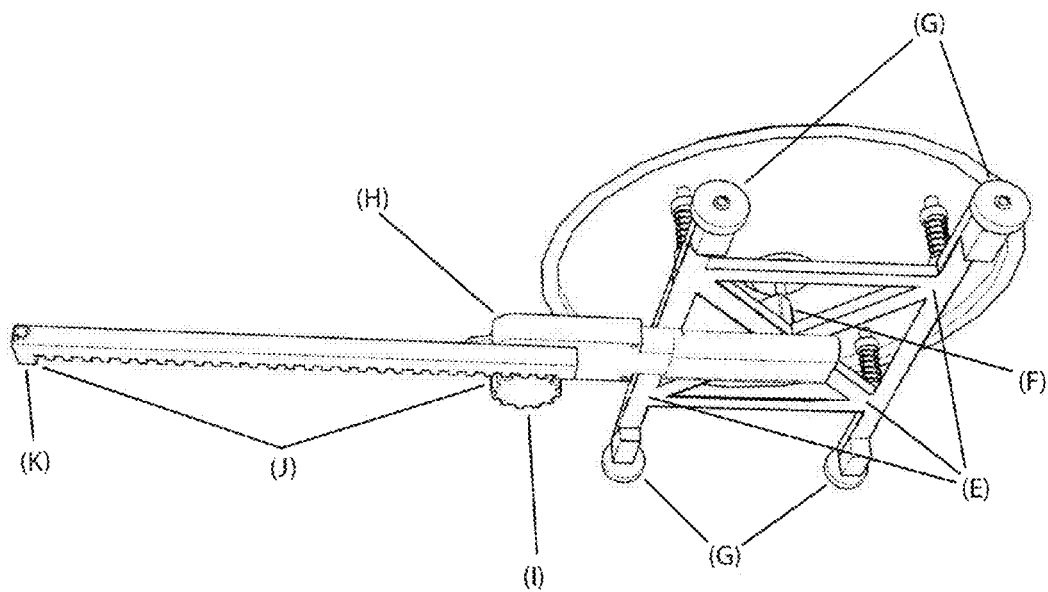
FIG. 3.A
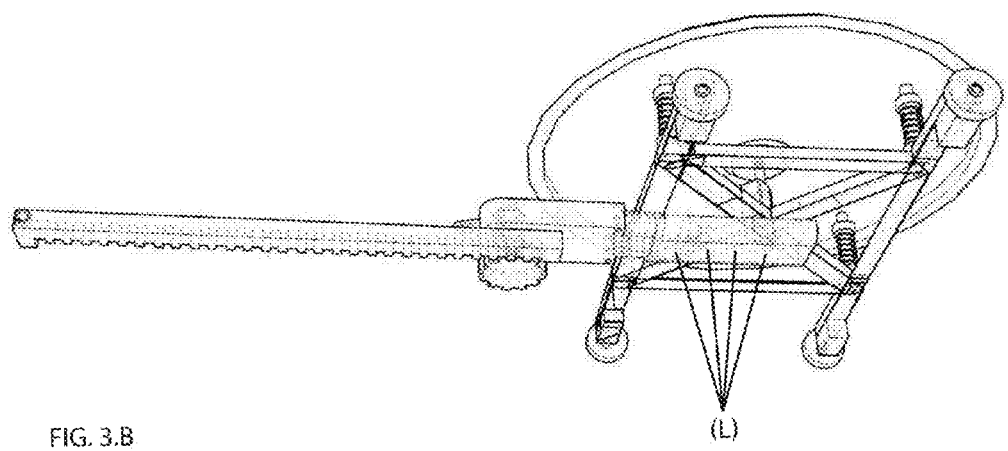
FIG. 3.B

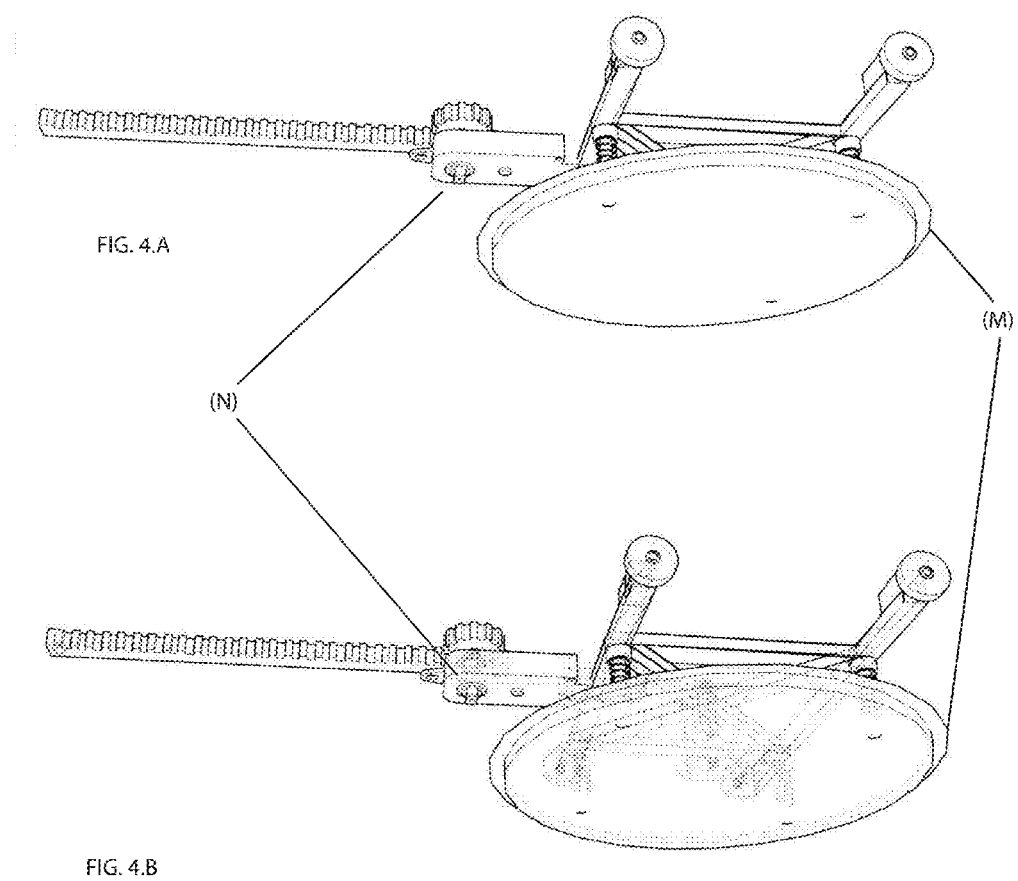
FIG. 4.A
FIG. 4.B

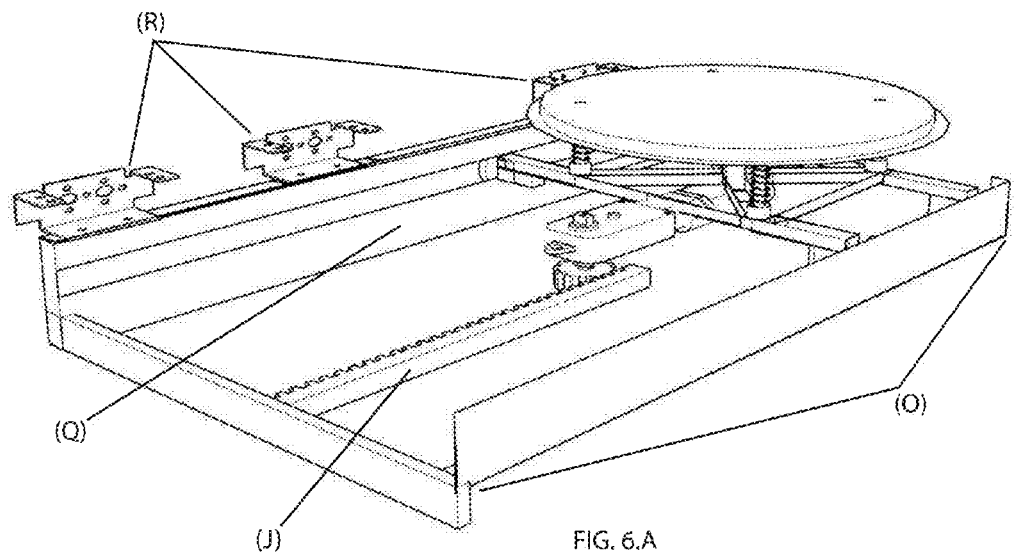
FIG. 6.A
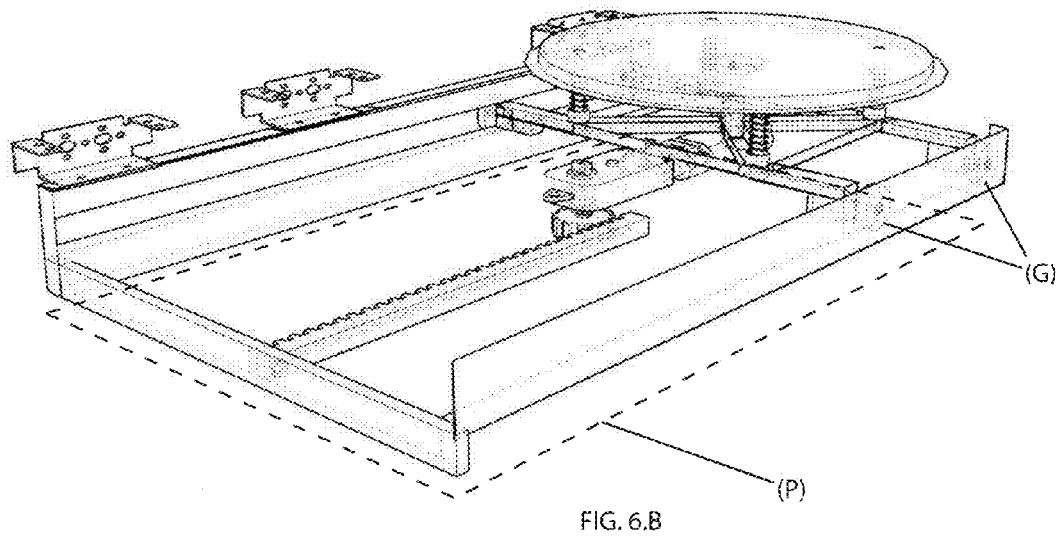
FIG. 6.B

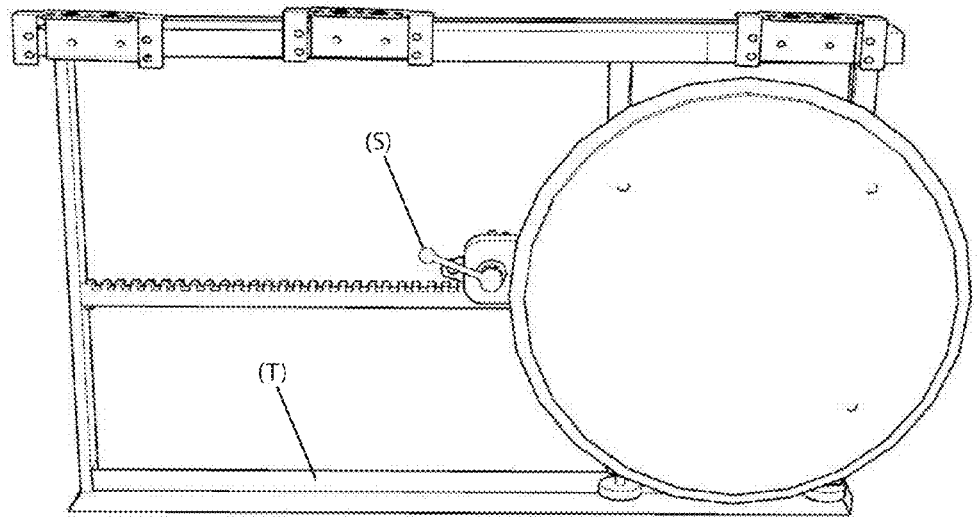
FIG. 7.A
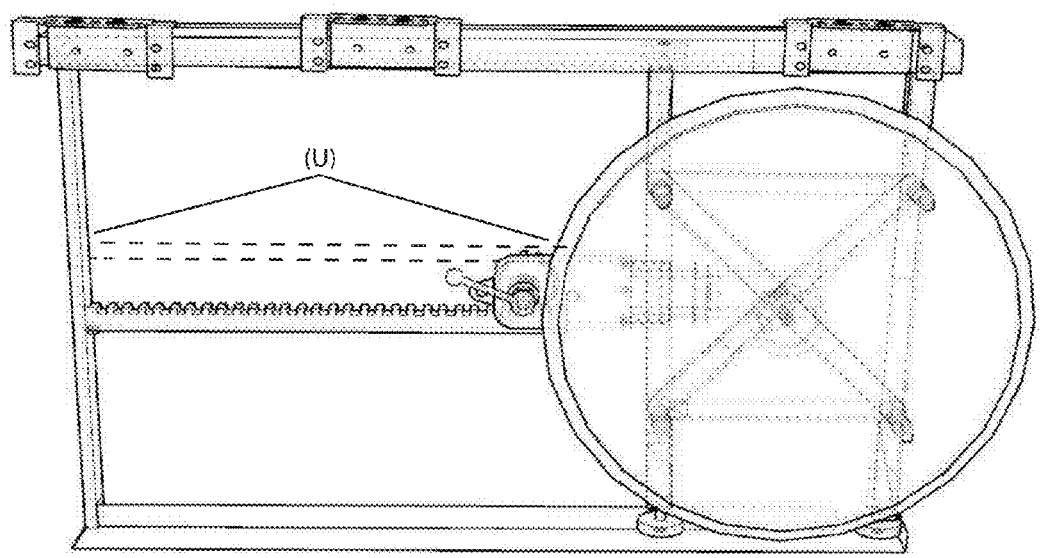
FIG. 7.B

RETRACTABLE VEHICLE FUELING RECEPTACLE COVER

This application claims the benefit of U.S. Provisional Application No. 61/934,630 filed Jan. 31, 2014.

FIELD OF THE INVENTION

The concept of this invention is to provide a retractable vehicle fueling receptacle cover (hereinafter also referred to as the "Lid") that will retract automatically upon instruction from the vehicle's onboard electronic control system and, further, will return to its original position, wherein it serves to protect the fueling inlet (whether such inlet allows for the storage of liquid fuel or for electrical charging), upon completion of a fueling or charging session, as instructed by the vehicle's onboard electronic control system.

BACKGROUND OF THE INVENTION

The primary application of this invention is to support the charging (or discharging, as the case may be) of electric vehicles; however, the teachings of the invention will also apply to fueling of vehicles propelled by liquid fuels. Therefore, while the focus of the description of this invention will relate more towards electric vehicles, the alternative application to liquid fueled vehicles should not be neglected.

Within the past decade there has been an increased awareness of the impact that carbon dioxide and methane emissions have on the earth's environment, and society has responded to the resultant global warming threat by adopting, where possible, clean energy generation practices and policies. In addition to a focus on renewable energy production, we have taken steps to curb excessive use of our fossil fuel energy resources. Consumers have engaged in energy efficiency and demand response programs so as to maximize the resources that are available to us.

Along with the shift in consumer sentiment (concerning the source of and use of electric energy), consumers have come to accept electric vehicles (EVs) as a realistic alternative to vehicles that are propelled by fossil fuels. Electric vehicles can function on the use of renewable energy, and they substantially reduce harmful exhaust pollutants that are emitted into the atmosphere.

One of the more salient concerns of potential EV owners is the phenomena known as "range anxiety". EVs are currently capable of traveling up to 300 miles on a full charge, but the time required to acquire a full recharge is a major concern (which may be several hours), as is the availability of appropriate charging equipment. The "range anxiety" of EV owners may be described as the concern of being stranded—if not indefinitely, then at least for several hours.

Still, for those drivers that tend to travel less than 200 miles on a given day and have a several hour period subsequent to traveling where the EV can be recharged, the EV can be a practical mode of transportation. However, for those instances where the EV owner may need to travel beyond a safe zone, a more wide-spread EV charging network may be necessary for the EV to appeal to the masses.

In addition to the need for a wide-spread charging network, the charging infrastructure equipment itself must be capable of engaging with the subject EV. Presently, while there are a variety of different charging connectors that are being utilized for a variety of differing EV platforms, attempts are being made to standardize the charging connectors and the accompanying receptacles for electric vehicles.

Furthermore, developments are being made to automate the charging of electric vehicles. Robotic technologies are being utilized to aid in the automation of EV charging, in part offering an added benefit of assisting physically impaired individuals to engage the electrical charging connector with a charging receptacle. Intellectual property protections have been granted to: Hoffman (U.S. Pat. No. 5,306,999); Lara (U.S. Pat. No. 5,461,298); Wilson (U.S. Pat. No. 5,646,500); Hayashi (U.S. Pat. No. 6,157,162) and Hollar (U.S. Pat. No. 7,999,506), while several additional applicants are pursuing variants of an automated or robotic charging system, including Haddad (Appl #20110254504); Cornish (Appl #20120233062); Bonny (Appl #20120286730); and Gao (Appl #20130076902). While each of the aforementioned intellectual property and applications involves the use of robotics in some manner, the introduction of standardized charging apparatus that facilitates the connection of the charging equipment will be necessary. In addition, the implementation of the teachings of this invention will be necessary in order to take full advantage of the features and benefits offered by the automated charging equipment and standardized connectors. To wit, the automated connection of charging equipment to an EV will continue to require human intervention in order to gain access to the vehicle receptacle absent the benefit of this invention.

SUMMARY OF THE INVENTION

The typical vehicle fueling or charging inlet Lid is an outward opening device, affixed to a hinged bracket.

There is no standard configuration in terms of which direction the Lid will open, and therefore an automated charging apparatus would be required to navigate the potentially unexpected position of the Lid which now becomes an obstacle for engaging in a charging or fueling session.

In addition, the typical vehicle fuel inlet Lid requires manual intervention in order to either place it in the open position or to return it to its closed, or protective, position.

The present invention addresses the shortcomings of the current art by introducing a retractable vehicle fuel receptacle cover, or Lid, assembly that opens automatically and stores itself within the body of the vehicle, upon instruction from the vehicle's onboard electronic computer control system, and further automatically returns the Lid to the position whereby it serves to protect the fueling inlet or charging receptacle, as instructed by the vehicle's onboard electronic computer control system.

A limited body of prior art addressing automated Lid opening technologies has been disclosed, but each application provides that the Lid opens outward; again, the outwardly protruding Lid represents an impediment to an otherwise unfettered approach to automated charging. Specifically, U.S. Pat. No. 6,194,854 (Uchibori) describes a device that will engage with a Lid that opens manually, so that the process of opening the Lid can be automated. This process requires a robotic apparatus that is capable of aligning an end effector that forcibly opens or closes the receptacle Lid.

Patent applications 20120019206 (Sediko), 20120049565 (Saito), 20130074985 (Ferguson), 20130074411 (Ferguson) and 20130196522 (Hara) describe, in general, a limited algorithm for opening or closing a door, and automated doors featuring wireless actuated unlatching assemblies.

Each of those applications indicates a Lid that opens outwardly, akin to the current manual mechanisms.

As previously described, the present invention overcomes the shortcomings of the other patent application disclosures, as ancillary equipment is not necessary to effect the desired end result, and the open position of the Lid in the present invention does not introduce an impediment to the efficient connection of automated charging equipment.

In the typical embodiment of the invention, the retractable vehicle fuel receptacle Lid will be controlled by the vehicle's on-board electronic computer control system. The Lid may be programmed to open upon interactive instruction with the vehicle's owner via, for example, touch screen or voice control. Alternatively, the vehicle, along with its computer system, may communicate wirelessly with an automated charging system that happens to be within physical reach and which is prepared to engage in an energy transfer session and, therefore, instruct the Lid to open in advance of the session and to close upon the conclusion of the session.

In an advanced embodiment of the invention, a vehicle energy management system will control all aspects of vehicle charging, including engagement in a session, price negotiation and billing settlement, bi-directional energy transference, and, of course, the opening and closing of the Lid.

These and other objects may become more apparent to those skilled in the art upon review of the summary of the invention as provided herein, and upon undertaking a study of the description of its preferred embodiments, in view of the drawings.

DESCRIPTION OF THE DRAWINGS

In referring to the drawings,

FIG. 1 provides two views of exemplary Lids, FIG. 1.A identifying a round configuration and FIG. 1.B identifying one in the shape of a Reuleaux triangle. The forms represent the ideal geometric shapes for a Lid, given the inability of either shape to protrude past the designated receptacle opening in the event that the internal placement of the Lid apparatus was altered or shifted;

FIG. 2 provides a view of the round Lid from two angles. FIG. 2.A shows a slight view of the outward facing surface of the Lid and FIG. 2.C shows the underneath portion; each revealing the Spring Loaded Pins. The Spring Loaded Pins are attached, on one end, to the Lid and on the other end, will be attached to the support Framework. Also shown as FIG. 2.B is the Actuator, which when engaged will serve to pull the Lid towards the Framework, and thereby compressing the Spring Loaded Pins;

FIG. 3 provides a schematic of the Lid mechanisms, including the underside of the Lid, the Spring Loaded Pins, the Actuator, the Framework, the Glide Wheels, the Servo Motor, the Gear and the Gear Track. FIG. 3.A shows the Lid and mechanisms in solid form whereas FIG. 3.B provides a transparent view of the FIG. 3.A Lid and mechanisms; FIG. 4 shows a rotated view of FIG. 3, with the exterior portion of the Lid exposed.

FIG. 4.A shows the Lid and associated mechanisms in solid form, whereas FIG. 4.B provides a transparent view of the FIG. 4.A Lid and mechanisms;

FIG. 6 provides a view of the Lid mechanisms within the confines of the Guide Structure, including the Glide Wheel Track, and introduces an instance of Mounting Brackets that will be utilized to affix the assembly to the vehicle body. FIG. 6.A shows the Lid and associated mechanisms in solid form, whereas FIG. 6.B provides a transparent view of the FIG. 6.A Lid and mechanisms;

FIG. 7 depicts the Lid assembly, further revealing the Glide Wheel Platform that is an integral portion of the Glide Wheel Track, and introducing the Servo Motor Switch Lever that will allow the vehicle owner to place the Lid opening process into a manual status. FIG. 7.A shows the Lid assembly in solid form, whereas FIG. 7.B provides a transparent view of the FIG. 7.A Lid assembly.

DESCRIPTION OF THE PREFERRED EMBODIMENT

Figure 5:
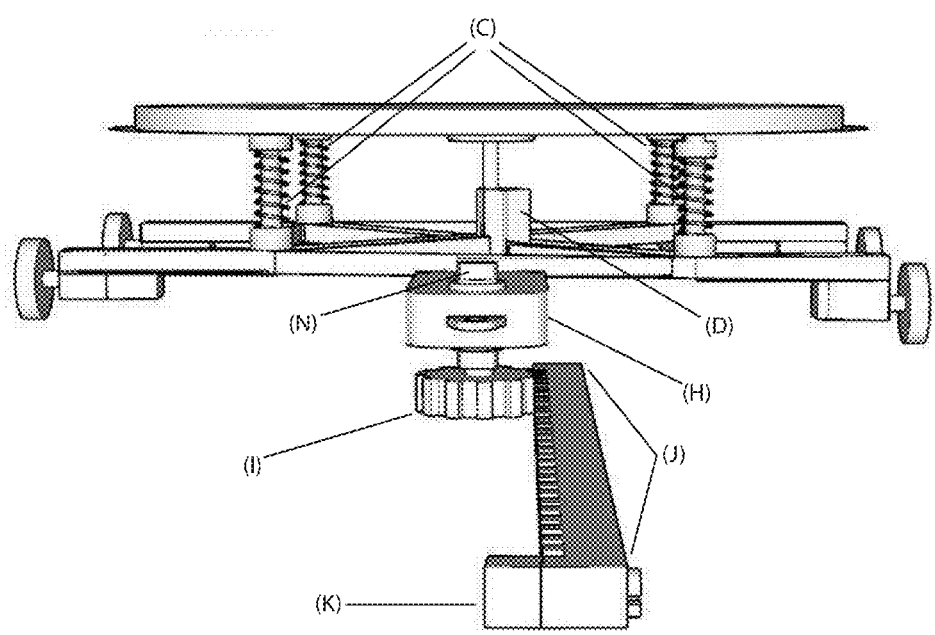
FIG. 5 demonstrates the mechanisms of the Lid system from an alternative point of view.

In the preferred embodiment, the vehicle's onboard electronic computer control system instructs the Actuator, which is affixed to the Lid, to contract, thereby compressing the Spring Loaded Pins and, as a consequence, the Weather Seal contact is disturbed and the Lid withdraws from its seated position. Once the Actuator is fully contracted, so that the vehicle Lid reaches sufficient clearance from the body of the vehicle so that it is able to travel unimpeded within the body of the vehicle, the vehicle's onboard electronic computer control system engages the Servo Motor, which is affixed to the Lid support Framework, so that the Gear is driven to turn in the direction that causes the retracted Lid and the related support Framework to traverse the Gear Track, aided by the freely rotating Glide Wheels that move along the Glide Wheel Track (which is located within the Guide Structure), to a point where the fuel inlet is completely exposed and the Lid is completely stowed within the body of the vehicle. At the point where the Lid and the supporting infrastructure have traveled the entire length of the Gear Track, the Actuator will release and allow the Spring Loaded Pins to decompress, at which point the Lid settles to rest upon a holding strut that features treated contact points to ensure that the finished portion of the Lid's surface is not harmed.

The vehicle's onboard electronic computer control system, or its energy management system, will detect the presence of the fueling nozzle or the charging connector, and will allow the Lid to remain inactive during the period of fueling or charging. Upon the removal of the nozzle or connector, the vehicle's operative system will detect the absence of the fueling equipment and will instruct the Lid's Actuator to contract, pulling the Lid away from the holding strut. The vehicle's operative system will then engage the Servo Motor so that the Lid and supportive Framework traverse the length of the Guide Structure in the direction of the fueling inlet, as the Servo Motor Gear engages with the Gear Track so as to force the Framework towards the fuel inlet receptacle opening. Upon reaching the end of the Gear Track, the Servo Motor will disengage and the Framework will come to rest. The vehicle's operative system will then instruct the Actuator to release itself from the contracted position, and the previously compressed Spring Loaded Pins expand so as to eject the Lid away from the Framework towards a resting position wherein the Weather Seal seats upon the lip of the fuel inlet receptacle opening and the Lid resumes its intended function of protecting the fuel inlet.

The invention overcomes the limitations and weaknesses of the current art through the following:
1. The Lid, being motor driven and controlled by the vehicle's onboard electronic computer control system, does not require direct human interaction to either open or close (save the potential engagement of the control interface via a touch screen pad or voice interaction).

2. The Lid does not require external equipment to influence its opening or closing
3. The Lid both opens and is stored within the body of the vehicle, thereby preventing a potential impediment to the external fueling equipment's line of sight path to engagement with the vehicles fueling inlet.
4. In the event of a malfunction, the Lid allows access to a release switch that disengages the Servo Motor to enable manual opening of the Lid.

In summary, the preferred embodiment associated with this provisional application describes a novel approach to the automation of a vehicle's fueling inlet Lid opening or closing, overcoming the weaknesses of opening a conventional Lid, especially for handicapped vehicle owners that may have mobility challenges due to physical afflictions. This invention further overcomes the weaknesses of previously disclosed motorized Lids, as this Lid, when opened, does not represent an impediment to all direct line of sight paths for fueling equipment to engage with the vehicle; moreover, other motorized configurations do not readily allow for manual overrides in the event of equipment malfunction.

In referring to the drawings of FIG. 1, FIG. 1.A shows a vehicle with a round fueling receptacle Lid (A), whereas FIG. 1.B presents a receptacle Lid in the configuration of a Reuleaux Triangle, both such Lids identified as being located on the rear quarter-panel of the vehicle.

FIG. 2 presents a view of the fueling receptacle Lid from two different angles. The first angle (FIG. 2.A) provides a glimpse of the outward facing surface of the Lid (B) and identifies the spring loaded pins (C) that are affixed to the Lid. FIG. 2.B identifies an actuator (D) that will be utilized to retract the Lid from its seated position by compressing the spring loaded pins. The second angle of view shows the Interior of the Lid, along with the affixed spring loaded pins (C) as well as the actuator (D).

FIG. 3 provides schematic views of the mechanisms that facilitate movement of the Lid. FIG. 3.A reveals that the spring loaded pins, affixed to the Lid on one end, are affixed to the framework (E) on the opposite end. The actuator is also affixed to the framework (F). Glide wheels (G) are located on the corners of the framework, in pairs which are (i) linearly aligned and are (ii) parallel in relation to their position vis-a-vis the framework. Additionally, a motor (H) is affixed to the framework, such motor which, when engaged, causes the gear (I) to turn in either (i) a clockwise or (ii) a counter-clockwise direction. The gear, when turning, engages with the gear track (J), thus forcing the (i) motor, the (ii) framework, and (iii) all associated components (including the Lid itself) to move along the gear track. The gear track contains a hard stop (K), so that in addition to the limitations placed on the motor by the vehicle's onboard electronic computer control system, or the inherent limitations of the motor itself, the framework will only be able to traverse the gear track over the pre-defined measure of the gear track. FIG. 3.B depicts the components of FIG. 3.A with additional transparency. The electrical leads (L) of both the motor and the actuator are identified on FIG. 3.B.

FIG. 4.A shows the Lid from a perspective wherein the exterior portion of the Lid is displayed. From this perspective the weather seal (M), which surrounds the perimeter of the Lid on an offset lip, is visible. Further, the figure identifies a switch (N) which, if set to the open position, would disengage the motor so that the Lid, the framework, the actuator and the motor assembly may be manually moved, such that the fueling inlet receptacle is no longer covered by the Lid. FIG. 4.B adds transparency to FIG. 4.A.

FIG. 5 provides a clear view of the manner in which the spring loaded pins (C) and the actuator (D) are affixed to the Lid and the framework, respectively. Also, the interaction of the motor (H), the gear (I) and the gear track (J) is visible. The motor engage/disengage Switch (N) is identified as well as the gear track hard stop (K).

FIG. 6 illustrates the guide structure which houses the Lid mechanisms. FIG. 6.A indicates the placement of the framework within the guide structure (O), and the position of the gear track (J) which is also affixed on its terminal end to the guide structure. FIG. 6.B reveals a back panel (P) which will be affixed to the guide structure, and which will serve to further support the gear track, as said gear track will be affixed to such back panel. FIG. 6.B identifies the glide wheels (G), which are shown in their enclosed position within the body of the guide structure and located upon the glide wheel track (Q) of FIG. 6.A. A form of mounting bracket (R) is presented; alternative bracket configurations may be employed, such as a single bracket running the length of the guide structure, but in any event the mounting bracket (or mounting brackets) shall be affixed to the guide structure on one of the bracket's surface and to the body of the vehicle on the opposite surface.

FIG. 7 shows a view of the Lid exterior and selected apparatus. As depicted in FIG. 7.A, a lever (S) is affixed to the motor switch to provide leverage so as to enable the vehicle owner to reposition the setting of the motor switch (from motor assisted to manual, and vice versa) with positional advantage. This figure further illustrates the glide wheel platform (T) that exists within the glide wheel track. Note that in the event that the either or both of the (i) actuator or the (ii) motor fails to operate, the Lid may be depressed on its left-most outer edge (due to the presence of spring loaded pins) so that the vehicle owner may access the motor switch lever (S). By disengaging the motor so that the Lid mechanisms are placed in manual mode, the vehicle owner may manually slide the Lid to an open position, so that the vehicle fuel inlet or charging receptacle may be engaged. FIG. 7.B reveals the gear support and guide (U) that will serve to contain the gear and ensure that the gear teeth remain in firm contact with the gear track.

The invention claimed is:

1. A retractable vehicle fuel receptacle cover assembly comprising a lid portion, said lid portion of said assembly being stored within a body of a vehicle when not in service, said lid portion having an exterior surface area, said lid portion consisting of a stamped or formed solid and rigid material defining said exterior surface area and which protrudes from a vehicle receptacle opening when in a service position, said exterior surface area of said lid portion having a perimeter that fits securely within a margin of said vehicle receptacle opening, said material further containing a lip having an extension on a perimeter of said exterior surface area, said lip having an offset from a plane of said exterior surface area with an outermost periphery of said lip remaining within an interior portion of said vehicle body at all times and said lip having a weather seal that abuts said body of said vehicle when in said service position;

a plurality of compressible individual support pins affixed to said lid portion on one end of said individual support pins, and a framework of the assembly on an opposite end of said individual support pins;

at least one actuator affixed to said lid portion on one end of said at least one actuator, and said framework of the assembly on an opposite end of said at least one actuator;

a stabilizing framework that underpins said lid portion, said individual support pins, and said at least one actuator, and which has affixed a plurality of axles on which at least one wheel per axle is provided that permits said stabilizing framework to traverse along a guide or track in a direction that is parallel to a plane of said vehicle body and to which a reversible electric motor is affixed that drives a gear to rotate in either a clockwise or a counter-clockwise direction;

a linear gear track made of rigid, solid material, that extends away from said lid portion for an expanse that is equal to or greater than the maximum linear distance between two points about said outermost periphery of said lip, said track containing notches or indentations that form a pattern such that teeth of said gear interact congruently with said notches or indentations as said gear rotates, and which material contains a border or hard stop affixed to an end of said material of said linear gear track that is furthest from said receptacle opening on said body of said vehicle that will prevent said gear from rotating past an end of said gear track;

said reversible motor affixed to said framework of the assembly which, when engaged by a vehicle's integral control system through electrical leads, will rotate said gear in either of a clockwise or a counter-clockwise direction; said motor to include a manual override switch to allow said framework of the assembly and all directly or indirectly connected devices to be positioned without assistance of said motor;

said gear appended to said reversible motor is configured to traverse said gear track in a direction and to a distance as commanded by said vehicle's integral control system, but said gear is configured to not traverse said gear track beyond said hard stop; and a structure that provides a foundation for the traversing of said at least one wheel of said stabilizing framework, having a backplane to which said gear track is affixed, said backplane to underpin and brace said gear track; said structure to be mounted to said interior portion of said vehicle body by mounting brackets that are affixed to said structure.

2. The retractable vehicle fuel receptacle cover assembly of claim 1 wherein said lid portion is provided in the shape of a circle or a Reuleaux triangle.

* * * * *